United States Patent
Martin

(10) Patent No.: US 8,336,430 B2
(45) Date of Patent: Dec. 25, 2012

(54) LATHE COMPOUND MULTI-TOOL

(76) Inventor: Peter B. Martin, San Diego, CA (US)

( * ) Notice: Subject to any disclaimer, the term of this patent is extended or adjusted under 35 U.S.C. 154(b) by 360 days.

(21) Appl. No.: 12/707,289

(22) Filed: Feb. 17, 2010

(65) Prior Publication Data

US 2011/0197722 A1    Aug. 18, 2011

(51) Int. Cl.
*B27C 7/06* (2006.01)
*B27C 7/00* (2006.01)

(52) U.S. Cl. .................................... 82/137; 82/112

(58) Field of Classification Search ............ 82/117, 82/137, 138, 112; 142/42, 49, 56
See application file for complete search history.

(56) References Cited

U.S. PATENT DOCUMENTS

| 2,450,788 | A | * | 10/1948 | Foster | 82/137 |
| 2,814,228 | A | * | 11/1957 | Garrett | 82/137 |
| 3,447,245 | A | * | 6/1969 | Holdridge | 33/636 |
| 3,835,528 | A | * | 9/1974 | Garrett | 29/560 |
| 4,063,577 | A | * | 12/1977 | Tennant | 142/49 |
| 5,566,597 | A | * | 10/1996 | Fazis | 82/1.11 |
| 5,634,250 | A | * | 6/1997 | Mihailovic | 29/26 A |
| 7,232,406 | B2 | * | 6/2007 | Komizo | 483/3 |
| 7,240,412 | B2 | * | 7/2007 | Sasazawa et al. | 29/27 C |

\* cited by examiner

*Primary Examiner* — Will Fridie, Jr.
(74) *Attorney, Agent, or Firm* — John K. Buche; Buche & Associates, P.C.

(57) ABSTRACT

Disclosed is an apparatus and related methods for facilitating the application of a cutting tool to a work-piece rotating on the axis of a lathe.

16 Claims, 8 Drawing Sheets

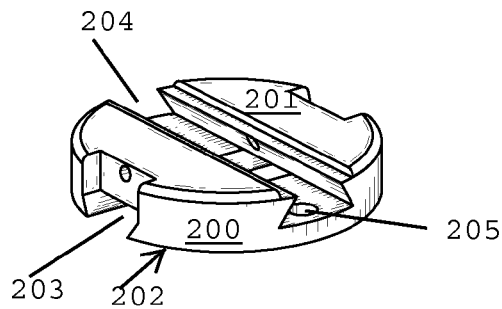
FIG. 9
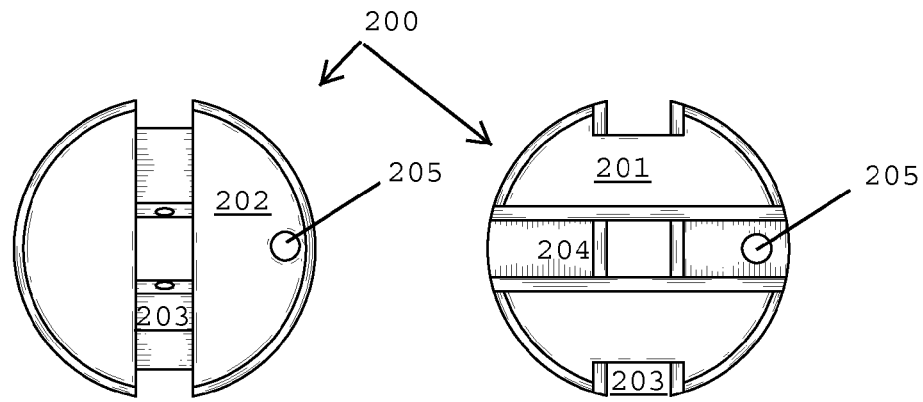
FIG. 10  FIG. 11
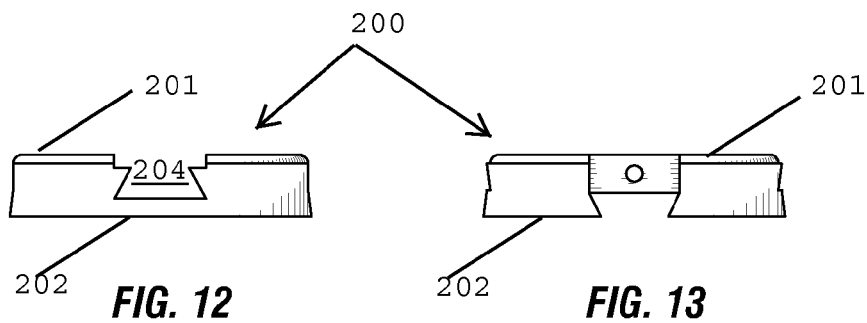
FIG. 12  FIG. 13
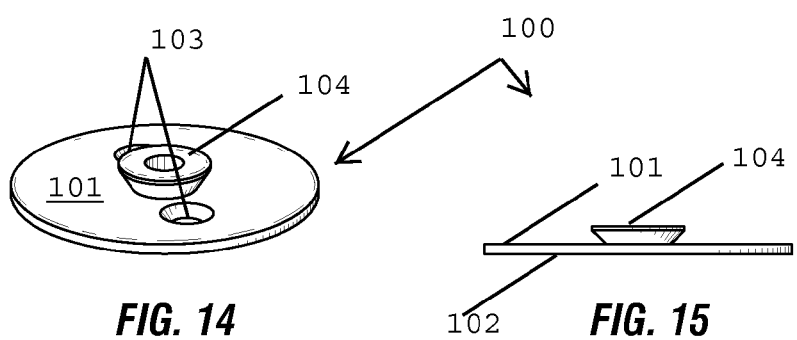
FIG. 14  FIG. 15

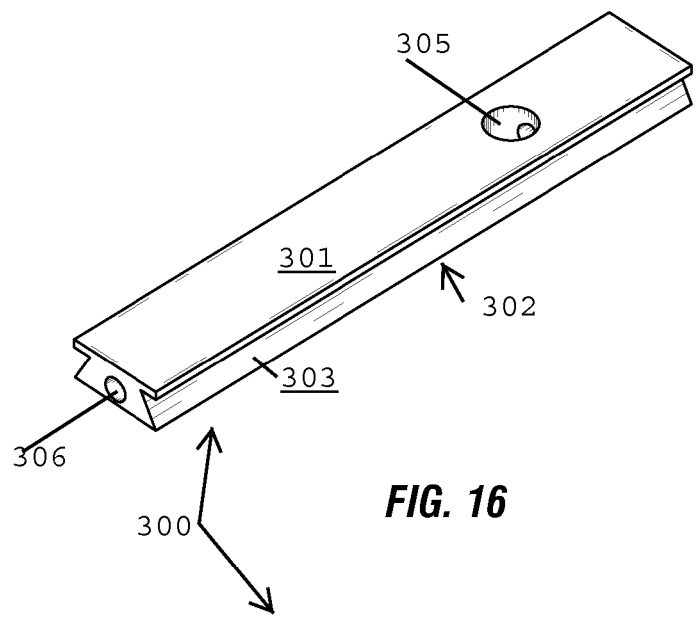
FIG. 16
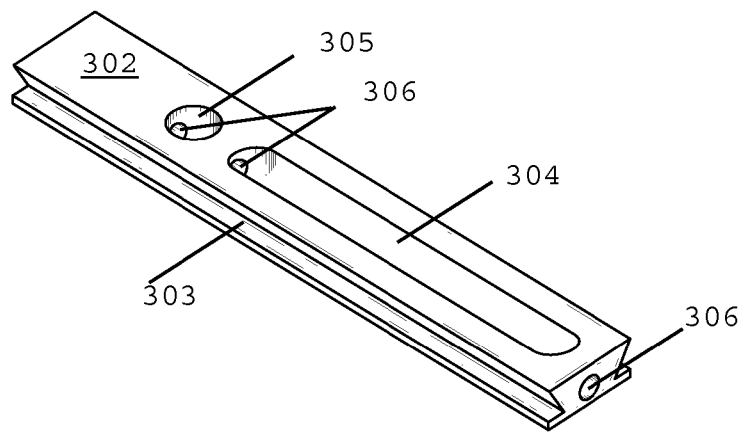
FIG. 17
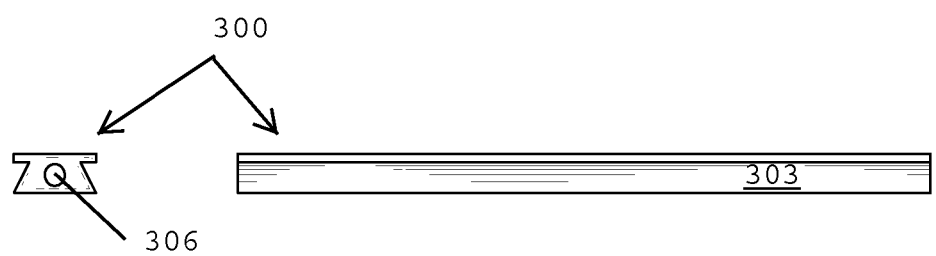
FIG. 18  FIG. 19

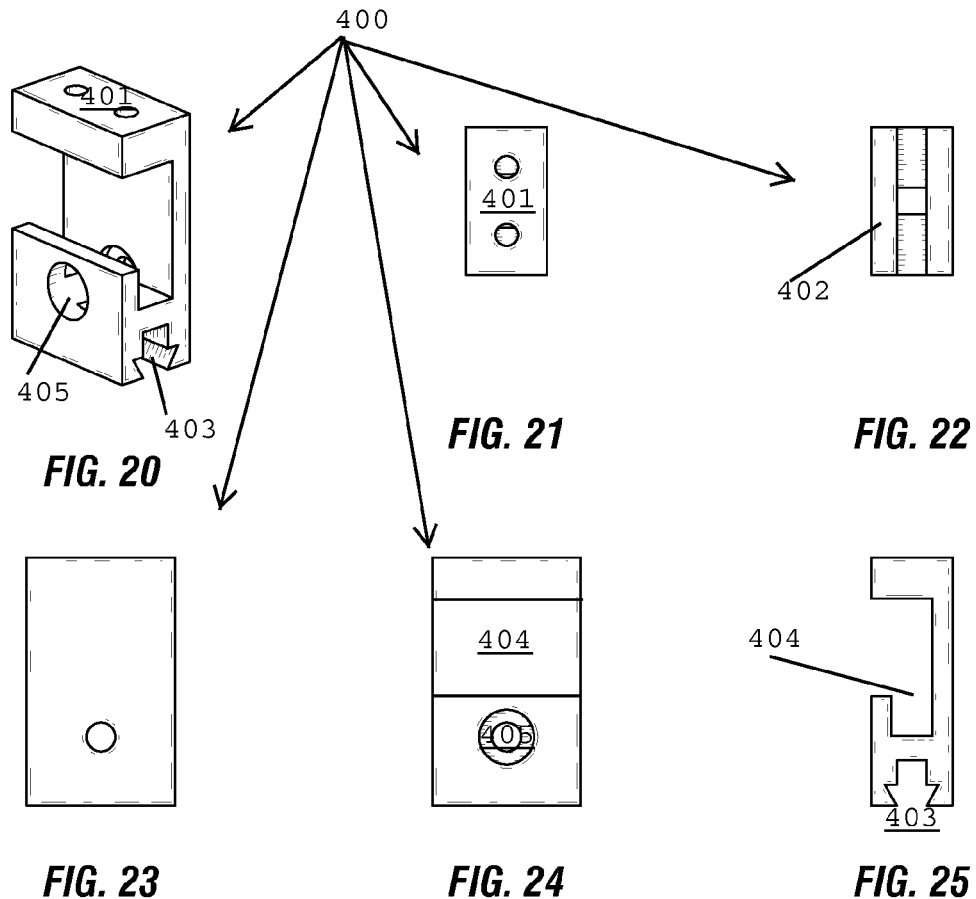
FIG. 20   FIG. 21   FIG. 22
FIG. 23   FIG. 24   FIG. 25
FIG. 26   FIG. 27
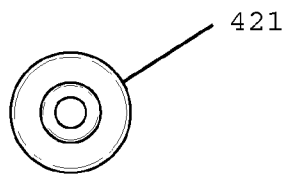 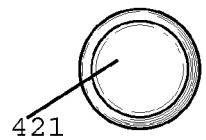
FIG. 28   FIG. 29

LATHE COMPOUND MULTI-TOOL

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of Invention

This disclosure is in the field of apparatus and related methods for facilitating the application of a cutting tool to a work-piece rotating on the axis of a lathe.

2. Background of the Invention

Lathes are tools which, among other things, spin a block of material around an axis of rotation. Frequently, tools are applied to the spinning material, i.e., work-piece, to perform various operations such as cutting, sanding, knurling, drilling, or deformation to create an object which has symmetry about the axis of rotation. Just as frequently, it is necessary to use the lathe and tool to create complex geometric shapes on the work-piece. For example, it is often necessary to create concave grooves, convex bulges, spherical facing, and tapering on a work-piece. Application of the tool to the work-piece by hand alone can be unsteady and may result in irretrievably inaccurate or unacceptable modifications of the work-piece and its associated geometric shape. Accordingly, apparatus and related methods were developed which facilitate the application of a tool to the work-piece of a lathe, including a means to guide taper, concave and convex radius, and tangential turn cutting operations. Such apparatus have heretofore been known as lathe tool-rests or lathe tool-holders.

Initially, lathe tool-rests were equipped with slide mechanisms (U.S. Pat. class code 82/137) for providing the tool-rest with heave and sway moveability (i.e., translational displacement), usually with respect to the lathe work-piece. The identified movement has heretofore been accomplished via: sliding the tool-rest along a dovetail and gib (see, e.g., U.S. Pat. No. 91,215 (issued Jan. 15, 1869)); or movement by lead screw mechanisms (see, e.g., U.S. Pat. No. 143,080 (issued Sep. 23, 1873)). Although an improvement over hand-held tool applications, heave or sway movements, by themselves, have not been completely satisfactory for use in connection with shaping a work-piece on a lathe. In particular, the limitation of only two translational degrees of freedom, as is the case for heave and sway tool-rests, restricts complex tapering or the creation of convex or concave geometries because, among other reasons: (1) the tool-holder must consistently be repositioned with respect to the work piece in order to provide directional tapers; and, (2) radial cuts or tapers, including concave or convex radial cuts, cannot be easily made since it would require simultaneous and accurate sway and heave tool movements. For these reasons, among others, further improved lathe tool-rests/holders were developed to facilitate the application of a tool to the work-piece of a lathe.

One advancement in lathe tool-rest apparatus involved the incorporation of a pivot (U.S. Pat. class code 82/12), in addition to slide mechanisms, whereby orientation of the heave and/or sway tool-rest movements may be readily set, and/or whereby yawing movements may be accomplished by the tool-rest (i.e., concave and convex radial cutting). For example: U.S. Pat. No. 55,749 (issued Jun. 19, 1866) generally discloses a tool-rest with a pivot "C" positioned proximate to a work-piece whereby a tool "F" may be rotated to make a convex spherical cut on the work-piece (see also U.S. Pat. No. 94,930 (issued Sep. 14, 1869) (tool "M" and pivot "i"), U.S. Pat. No. 670,962 (issued Apr. 1, 1901) (tool "a" and pivot "C"), U.S. Pat. No. 923,757 (issued Jun. 1, 1909) (tool "46" and pivot "19"), U.S. Pat. No. 1,201,004 (issued Oct. 10, 1916) (tool "6" and pivot "19"), U.S. Pat. No. 1,556,949 (issued Oct. 13, 1925) (tool "16" and pivot "37"), U.S. Pat. No. 1,626,936 (issued May 3, 1927) (tool "17" and pivot beneath axis of rotation "35"), U.S. Pat. No. 2,295,014 (issued Sep. 8, 1942) (tool "43" and pivot "48"), U.S. Pat. No. 2,460,342 (issued Feb. 1, 1949) (tool "26" and pivot "11"), U.S. Pat. No. 2,828,658 (issued Apr. 1, 1958) (tool "14" and pivot "18"), U.S. Pat. No. 3,064,510 (issued Nov. 20, 1962) (tool "25" and pivot "B"), U.S. Pat. No. 3,447,245 (issued Jun. 3, 1969) (tool "35" and pivot "47"), U.S. Pat. No. 3,345,893 (issued Oct. 10, 1967) (tool "35" and pivot "47"), and, U.S. Pat. No. 5,566,597 (issued Oct. 22, 1996) (tool "9" and pivot "11")); and, U.S. Pat. No. 637,769 (issued Nov. 28, 1899) generally discloses a sliding tool rest "D" placed on a "axially-pivoted swivel C" which is movably secured to a lathe carriage for cutting concave radial cuts (see also U.S. Pat. No. 759,083 (issued May 3, 1904) (tool "B" pivot "f"), U.S. Pat. No. 867,798 (issued Oct. 8, 1907) (tool "14" and pivot "6"), U.S. Pat. No. 2,295,014 (issued Sep. 8, 1942) (tool "46" and pivot "62"), U.S. Pat. No. 2,435,212 (issued Feb. 3, 1948) (tool "23" and pivot "11"), U.S. Pat. No. 2,450,469 (issued Oct. 5, 1948) (tool "23" and pivot "24"), U.S. Pat. No. 2,467,070 (issued Apr. 12, 1949) (tool "23" and pivot "3"), U.S. Pat. No. 2,529,551 (issued Nov. 14, 1950) (tool "34" and pivot "40"), U.S. Pat. No. 2,703,032 (issued Mar. 1, 1955) (tool "25" and pivot "19"), U.S. Pat. No. 3,447,245 (issued Jun. 3, 1969) (FIG. 2, tool "35" and pivot "47"), U.S. Pat. No. 3,345,893 (issued Oct. 10, 1967) (FIG. 2, tool "35" and pivot "47"), and U.S. Pat. No. 4,750,392 (issued Jun. 14, 1988) (tool "38" and pivot "40")). Although better than tool-rests with only sliding mechanisms, there is room for improvement in tool-rests with pivot and sliding mechanisms. Consider the following drawbacks, among others not specifically recited. First, the above-disclosed apparatus are complex in terms of operation whereby many tool rest components must be set and adjusted prior to making even a single cut. Notably, many of the moving parts cannot easily be manipulated simultaneously, if simultaneously manipulable at all. Second, the above disclosed tool-rests must be uninstalled and reinstalled at different locations along the work piece, or used in conjunction with a particular type of lathe to complete a full spherical or radial cut or otherwise shape the entire work-piece. This drawback is particularly offensive since timely repositioning of the tool-rests' carriage is often involved. Third, many of the above disclosed embodiments are inefficiently designed whereby excessive amounts of materials are required for tool-rest fabrication. Fourth, many of the subject tool-rests restrict the initial size of the work-piece since, the tool-rests feature non-cutting components that are in close proximity to a lathe's axis of rotation. Fifth, the above cited devices are designed for making radial cuts and do not also effectively cut tapers. Sixth, a primary drawback of the above-disclosed tool-rests is the absence of an operable secondary pivot point for enabling compound radius turning or tapering operations (i.e., the application of a tool to a work piece via manipulating a second operable pivot point in addition to rotation of the tool around the primary pivot and/or linear movements of the tool). The identified lack of an operable secondary pivot point restricts the types of geometries capable of being cut by the tool-rest and prevents the use of a roulette motion to control precise radial tool path and orientation along the desired work piece cuts. Accordingly there is a need for a tool rest that avoids the drawbacks identified above.

Apparatus are further known which may have a secondary pivot. For example, U.S. Pat. No. 684,508 (issued Oct. 15, 1901) discloses a tool-rest featuring a primary pivot, "H," wherein a second pivot may be at the tool-prop, "D." However the pivot at prop "D" is not completely operable since the prop "D" is not movable to cut or shape a work-piece. Rather, the prop "D" is secured in a particular orientation for guiding a hand-held tool, whereby reorientation of the prop "D" and cutting the work-piece require separate and time consuming steps. Furthermore, the prop "D" is not operable in that smooth and workable rotation cannot be accomplished since the prop "D" must be locked in position via a clamp "C" prior to cutting the work piece. In other words, the apparatus cannot be used for compound radius or tapering operations since the apparatus cannot accomplish the application of a tool to a work piece via manipulating a second pivot point in addition to rotation of the tool around the primary pivot and/or linear movements of the tool. For another example, U.S. Pat. No. 2,386,984 (issued Oct. 16, 1945) discloses a tool-rest featuring a first, "19," and second, "25," pivot. However, the second pivot "25" is not entirely operable since, the screw "26" must be loosened to enable pivoting, the pivot arc is restricted to only the path "27," and the screw "28" must be turned in order to accomplish rotation around the pivot "25." As above, the pivot "25" is not manipulable to accomplish cutting or tapering, but rather the cutting may only be accomplished via movement around the first pivot "19". Specifically, the second pivot "25" is only for aligning the cut. In other words, reorientation of the tool via the second pivot 25 and actually cutting the work-piece require separate and time consuming steps. Thus, the disclosed apparatus cannot be used to make compound radial or tapering cuts. In addition, the identified lack of an operable secondary pivot point restricts the types of geometries capable of being cut by the tool and prevents the use of a roulette motion to control precise radial tool path and orientation along the desired work piece cuts. Finally, for yet a further example, U.S. Pat. No. 2,716,913 (issued Sep. 6, 1955) and U.S. Pat. No. 4,497,144 (issued Feb. 5, 1985) disclose cutters with multiple pivot points. However, the multiple pivot points do not amount to separate and operable pivots since they are not independent from one another and all pivots must be moved in concert to accomplish a particular cut. Furthermore, all of the heretofore disclosed tool-rests are composed of excessive moving parts whereby the strength and integrity of the tool may be easily compromised and whereby construction and fabrication of the tool-holders are overly complex and expensive. In addition, most of the identified examples feature the drawbacks as identified in the preceding paragraph. Accordingly, there is a need for a lathe tool-holder having separate and independently operable pivots for facilitating the application of a tool to a work piece and that may further be used for making compound radial or tapering cuts.

SUMMARY OF THE INVENTION

It is an object of this application to disclose a practical multi-functional accessory and method to aid lathe machine tool operators in accomplishing complex cutting operations. In particular, it is an object of this invention to disclose a multi-functional lathe tool holder capable of efficiently accomplishing compound radial and tapering cuts on a lathe work-piece. In general, the disclosed apparatus may comprise: a first operable pivot point; and, a second operable pivot point, preferably provided with a cutting tool, wherein the second operable pivot point is linearly and/or diametrical movable across, and with respect to, the first pivot point. In other words, what is disclosed may be a tool apparatus for use with a lathe comprising: a first operable pivot point; and, a second operable pivot point, configured to receive a cutting tool, wherein the second operable pivot point is disposed on a rail for repositioning the axis of rotation of the second operable pivot point in relation to the axis of rotation of the first pivot point. Yet still in other words, the disclosed apparatus may accomplish the application of a tool to a work piece via manipulating the second operable pivot point in addition to rotation of the tool around the first pivot and/or linear movements of the tool. In a proposed embodiment, the apparatus is a mechanical assembly that is fashioned as a bolt-on lathe tool holder which is comprised of four basic subassemblies, namely: a base; a pivot body; a rail; and a tool holder. While this design is optimized for bench-top equipment (including mini-lathes), its advantages apply equally well to larger manual lathes and computer numeric controlled (CNC) production systems.

It is further an object of the invention to disclose an apparatus for facilitating the application of a tool to a work-piece mounted on the rotating axis of a lathe, the apparatus featuring an ability to produce an offsetable pivot (i.e., a second pivot point off set from a first pivot point) which facilitates improved surface finishes and efficiencies in parting and turning spheres, toroid, tapers, tapered bores convex, and concave geometry.

It is yet another object of the present application to meet the aforementioned needs without any of the drawbacks associated with apparatus heretofore known for the same purpose. It is yet still a further objective to meet these needs in an efficient and inexpensive manner.

BRIEF DESCRIPTION OF THE FIGURES

The manner in which these objectives and other desirable characteristics can be obtained is explained in the following description and attached figures in which:

FIG. 9 is a perspective view of the pivot body 200 composing the apparatus 1 of FIG. 1.

FIG. 10 is a bottom view of the pivot body 200 of FIG. 9.

FIG. 11 is a top view of the pivot body 200 of FIG. 9.

FIG. 12 is a side view of the pivot body 200 of FIG. 9.

FIG. 13 is an alternate side view of the pivot body 200 of FIG. 9.

FIG. 14 is a perspective of the base 100 composing the tool-holder 400 of FIG. 1.

FIG. 15 is a side view of the base of FIG. 14.

FIG. 16 is a top perspective view of the rail 300 composing the apparatus 1 of FIG. 1.

FIG. 17 is a bottom perspective view of the rail 300 of FIG. 16.

FIG. 18 is a front view of the rail 300 of FIG. 16.

FIG. 19 is a side view of the rail 300 of FIG. 16.

FIG. 20 is a perspective view of the tool-holder 400 composing the apparatus 1 of FIG. 1.

FIG. 21 is a top view of the tool holder 400 of FIG. 20.

FIG. 22 is a bottom view of the tool holder 400 of FIG. 20

FIG. 23 is a back view of the tool holder 400 of FIG. 20.

FIG. 24 is a front view of the tool holder 400 of FIG. 20.

FIG. 25 is a side view of the tool holder 400 of FIG. 20.

FIG. 26 is a perspective view of a cam lobe 421 composing the tool holder 400.

FIG. 27 is a radial view of the cam lobe 421 of FIG. 26.

FIG. 28 is a side view of the cam lobe 421 of FIG. 26.

FIG. 29 is an alternate side view of the cam lobe 421 of FIG. 26.

It is to be noted, however, that the appended figures illustrate only typical embodiments of this invention, and therefore, are not to be considered limiting of its scope, for the invention may admit to other equally effective embodiments that will be appreciated by those reasonably skilled in the relevant arts. Also, figures are not necessarily made to scale.

DETAILED DESCRIPTION OF PREFERRED EMBODIMENTS

Figure 1:
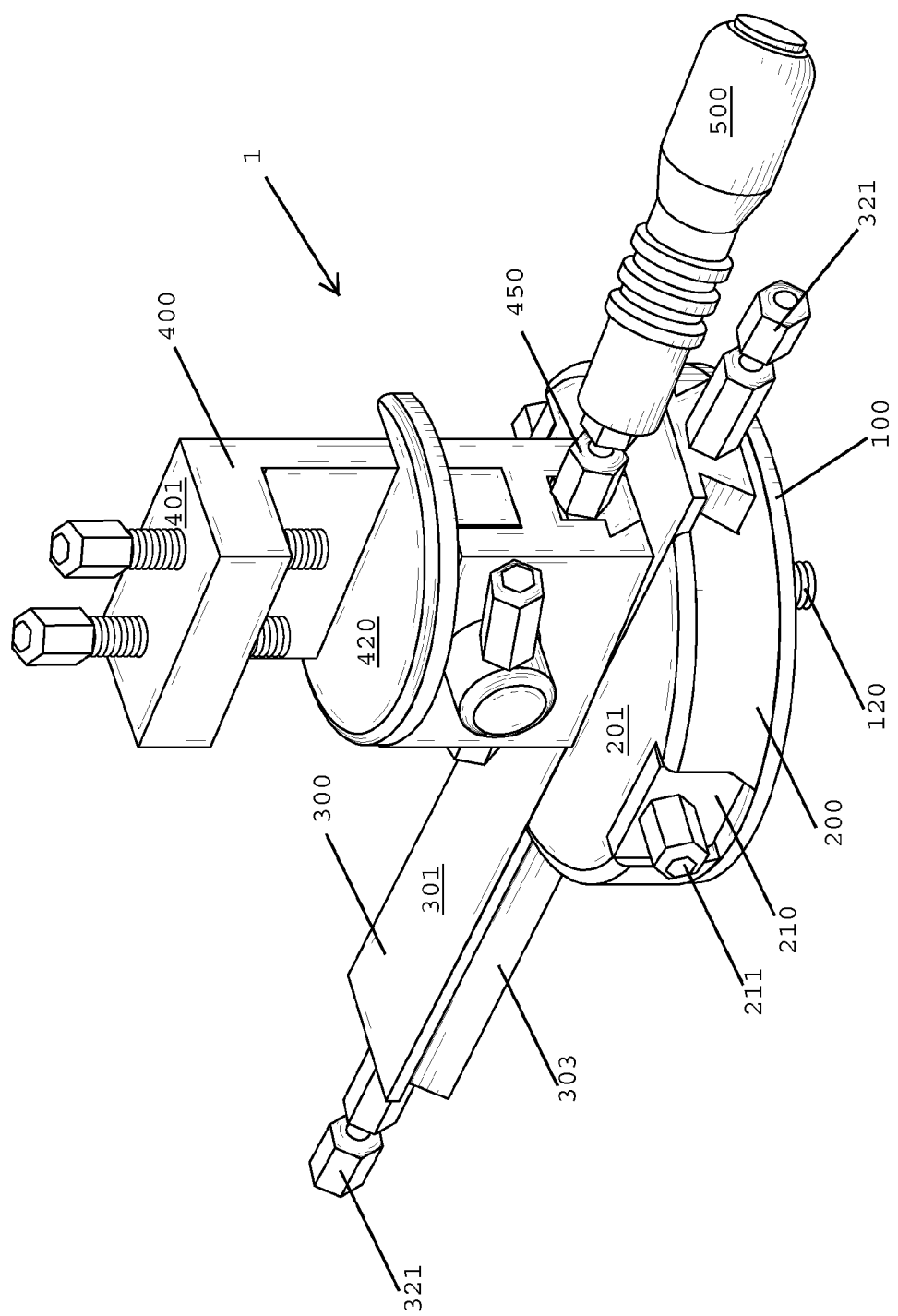
FIG. 1 is a perspective view of an embodiment of an apparatus 1.

The apparatus disclosed by this application may be a cutting tool holder to be used in conjunction with a lathe (particularly bench lathes or mini-lathes). The apparatus generally comprises: a first operable pivot point; and, a second operable pivot point, preferably provided with a cutting tool, wherein the second operable pivot point is linearly and/or diametrical movable across, and with respect to, the first pivot point. In other words, what is disclosed may be a tool apparatus for use with a lathe comprising: a first operable pivot point; and, a second operable pivot point, configured to receive a cutting tool, wherein the second operable pivot point is disposed on a rail for repositioning the axis of rotation of the second operable pivot point in relation to the axis of rotation of the first pivot point. The apparatus facilitates the shaping of a work-piece that is rotating on a lathe axis via directing the application of the cutting tool to the surface thereof. More specifically, complex geometries may be created on the work-piece surface by offsetting the second pivot point from the first pivot point whereby the operator may apply the tool to the work-piece according to various methods of compound turning or tapering (i.e., applying the tool to a work piece via manipulating the second operable pivot point in addition to rotation of the tool around the first pivot and/or linear movements of the tool). The more specific details and aspects of the disclosed embodiment are further described below with reference to the figures FIG. 1 is a perspective view of an apparatus 1 embodying the present patent application. FIGS. 2 through 7 depict six orthogonal views of the apparatus 1 depicted in FIG. 1. More specifically, FIGS. 2 through 7 respectively depict a first, second, third, fourth, top, and bottom orthogonal view of the apparatus 1. As seen in the figures, the apparatus 1 may comprise: a base 100; a pivot body 200; a rail 300; a pivoting tool holder 400; and a quick change handle 500. Taken together, FIGS. 1 through 7 suitably illustrate the basic features of the apparatus 1.

Figure 2:
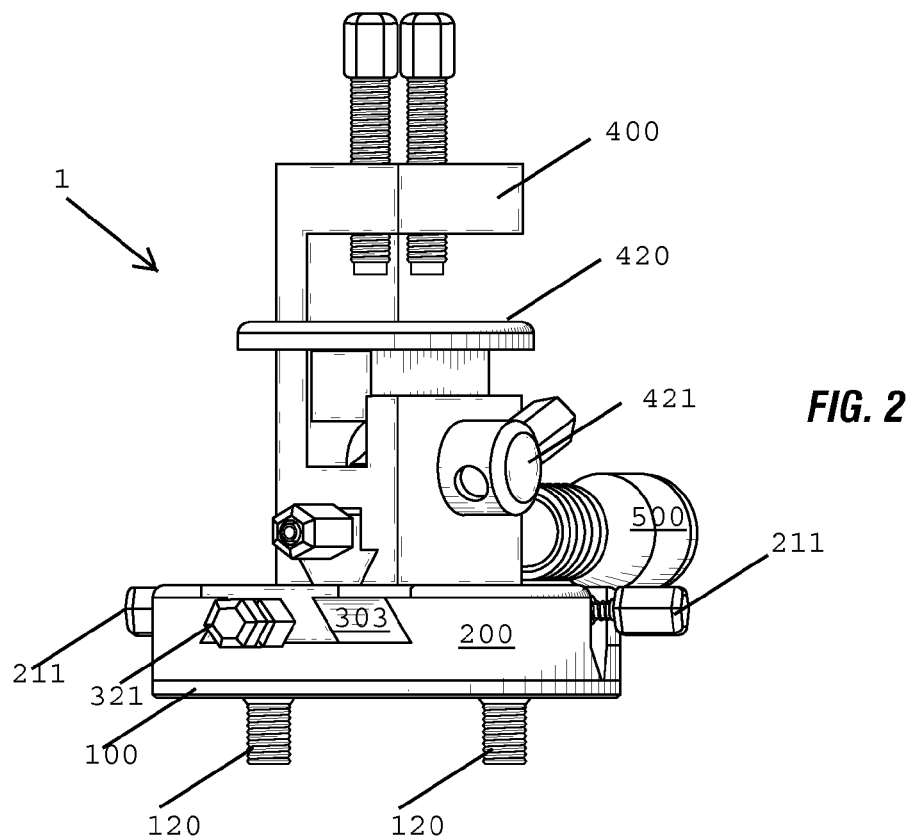
FIG. 2 is a first horizontal orthogonal view of the apparatus 1 of FIG. 1.
Figure 3:
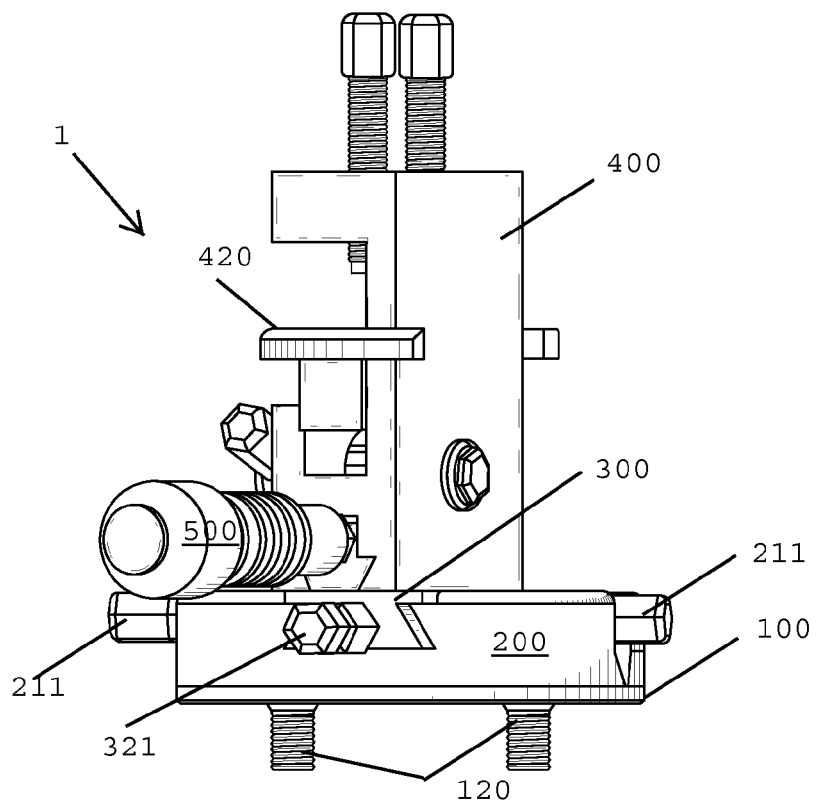
FIG. 3 is a second horizontal orthogonal view of the apparatus 1 of FIG. 1.
Figure 4:
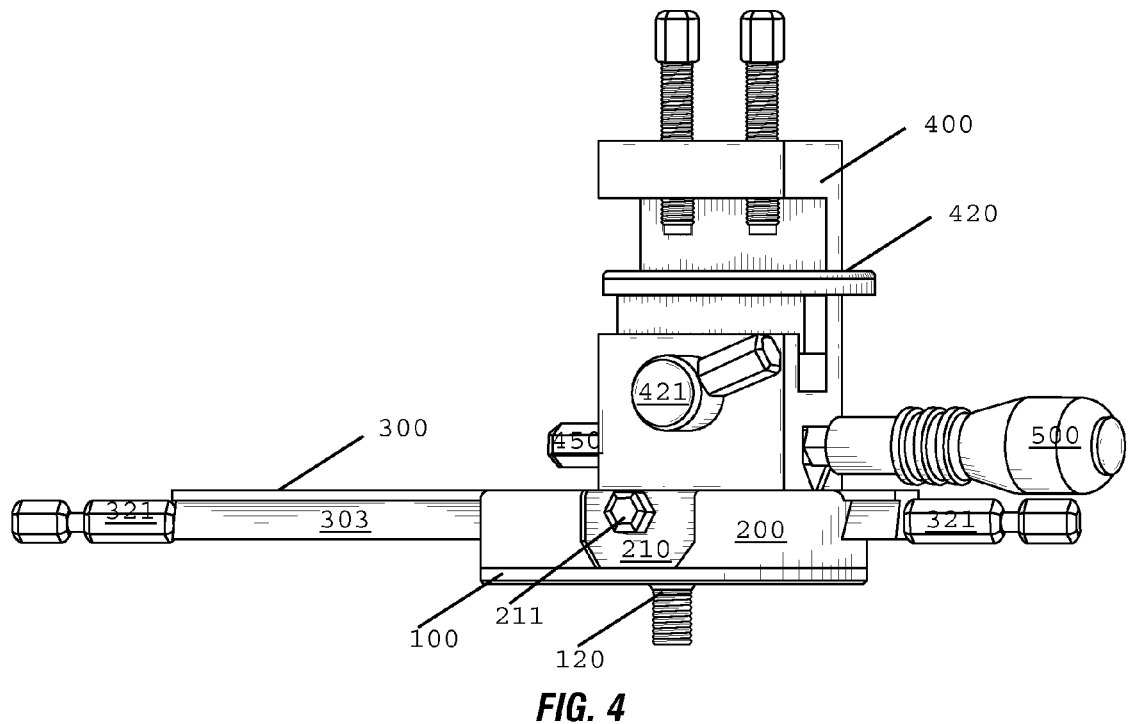
FIG. 4 is a third horizontal orthogonal view of the apparatus 1 of FIG. 1.
Figure 5:
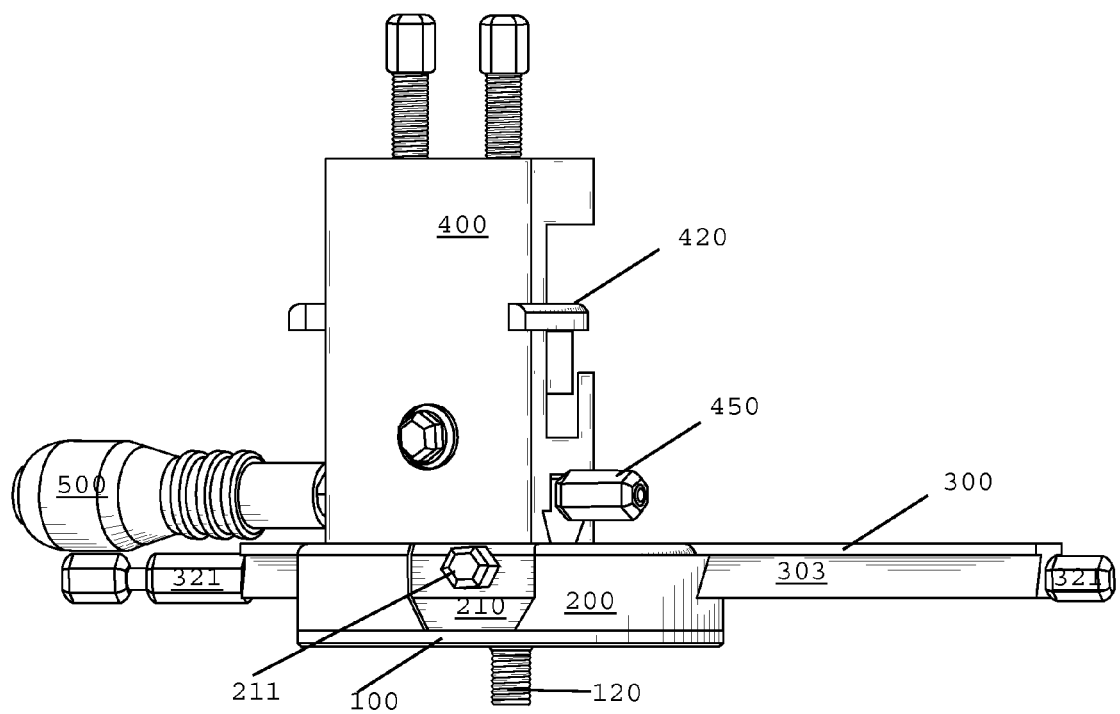
FIG. 5 is a fourth horizontal orthogonal view of the apparatus 1 of FIG. 1.
Figures 6, 7:
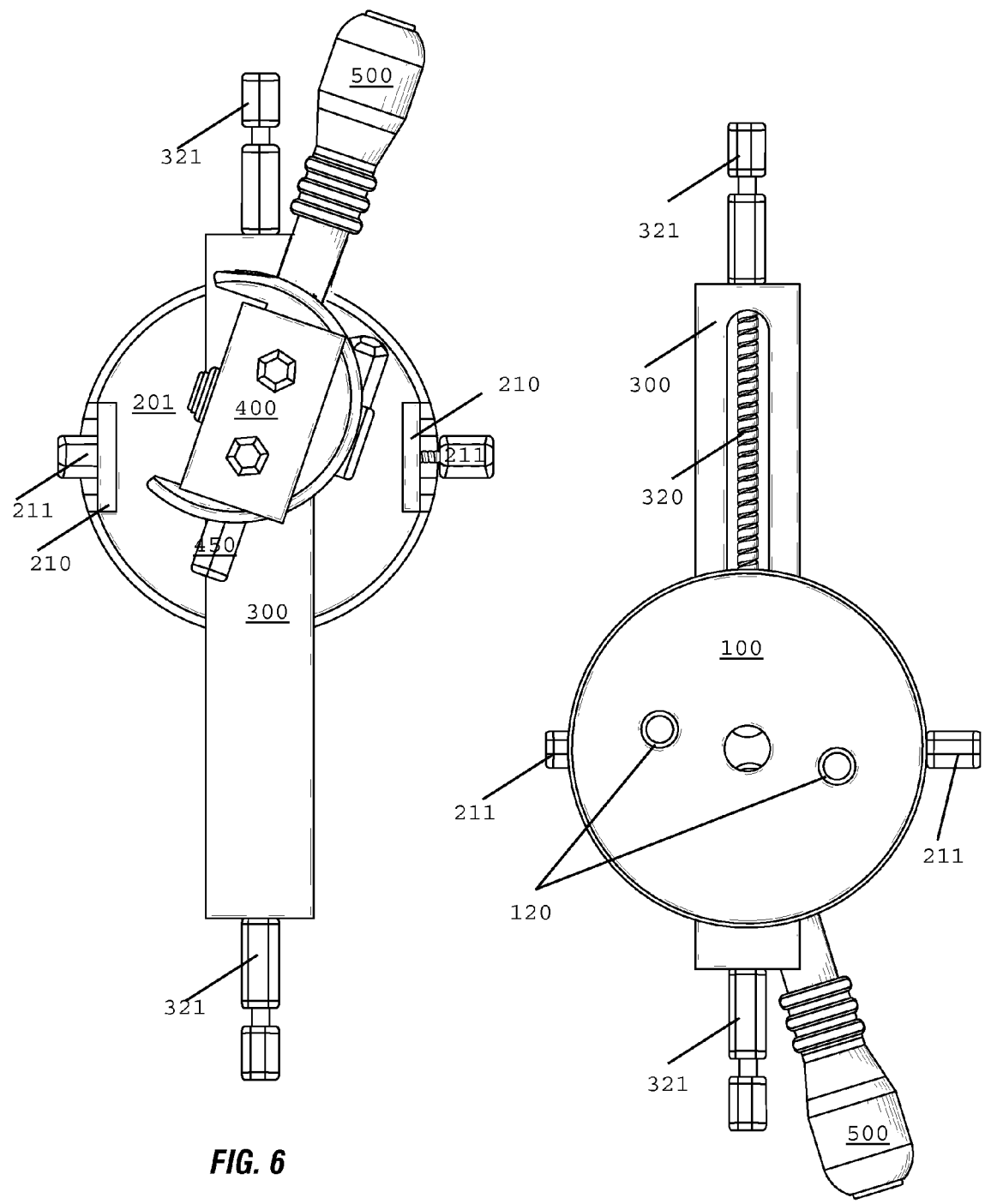
FIG. 6 is a top orthogonal view of the apparatus 1 of FIG. 1
FIG. 7 is a bottom orthogonal view of the apparatus 1 of FIG. 1

Referring first to FIGS. 2 and 3, the apparatus 1 may feature screws 120 for securing the apparatus 1 to a support in the proximity of a lathe, e.g., the cross-slide of a lathe or a bench top. Referring now to FIGS. 1 through 3 and 7, the base 100, in a manner discussed below, preferably and swivelably interacts with the pivot body 200 to produce a first operable pivot point generally located at the concenter of the base 100 and pivot body 200. Referring now to FIGS. 1 and 4 through 7, the rail 300, in a manner also discussed below, is slidably seated within the pivot body 200, whereby the rail 300 may move linearly and diametrically to and fro, across the first pivot point of the apparatus 1. Referring now to FIG. 1 and FIG. 6, the tool holder 400, in a manner yet still discussed below, is swivelably seated on the rail 300 to effect a second operable pivot point on the apparatus 1. Suitably, linear movement of the rail 300 with respect to the pivot body 200 manipulates the position of the tool holder 400 (the second operable pivot point) with respect to the pivot body 200 center (the first operable pivot point). The apparatus 1 may be used to accomplish compound turning or tapering by manipulating tool holder 400 (the second operable pivot point) in addition to the turning movements of the pivot body 200 (the first operable pivot point) and the linear movements of the rail 300 while a tool held by the tool holder 400 is applied to a work piece. Methods and modes of operation will be further disclosed after the subcomponents of the apparatus 1 have been shown and described in detail.

Figure 8:
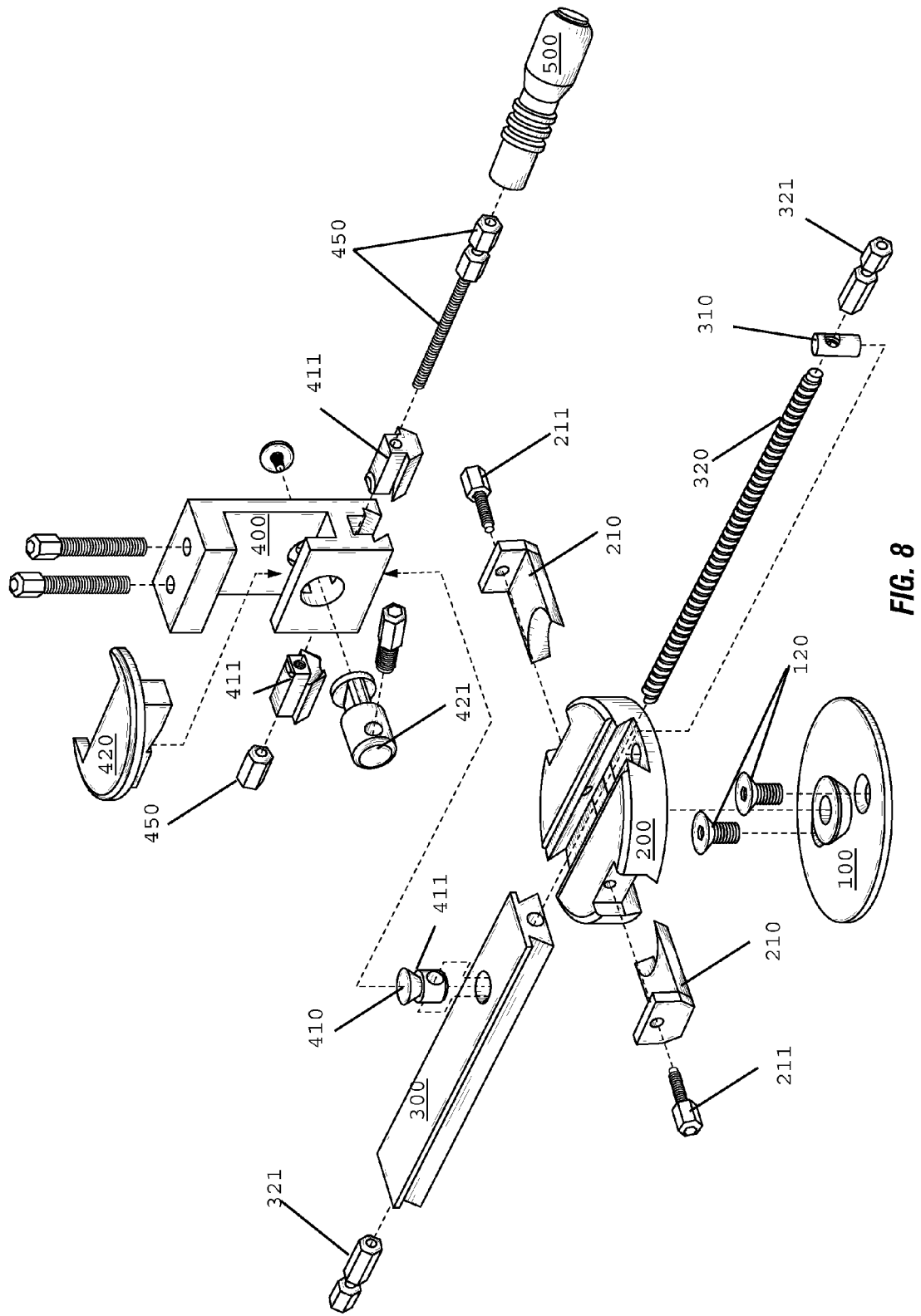
FIG. 8 is an exploded view of the apparatus 1 of FIG. 1.

The base 100 suitably secures the apparatus 1 to a support and provides a swiveling seat thereon for the pivot body 200. The structural features of the base 100 are best seen in FIGS. 8, and 14 and 15 (FIG. 8 is an exploded view of the base 100, FIG. 14 is a perspective view of the base 100, and FIG. 15 is a side view of the base 100). Referring to those figures, the base 100 comprises a top 101, bottom 102, apertures 103, and a spindle 104. The top 101 of the base 100 may be generally planar with the apertures 102 passing therethrough to the bottom 102 and with the spindle 104 projecting normal therefrom at approximately its center. Typically, screws 120 are passed through the apertures 102 and fitted with nuts whereby the base 100 may be affixed to a support (see, e.g., FIG. 1 through 5 and 7). Referring to FIG. 8, the screws 120 should feature a flat head whereby the screw 120 heads are co-planar with the top 101, or below, when fitted into the apertures 102. Referring now to FIG. 15, the spindle 104 may generally be a cylinder with a downward tapering diameter, to create a groove between the base top 101 and the top of the spindle 104.

In one embodiment, the base 100 may be a circular disk which is dimensioned as follows: diameter, 2.468 inches; height (between top 101 and bottom 102 surfaces), 0.94 inches; apertures 102 positioned 1.260 inches off center with a diameter of 0.236 inches; the spindle concentrically position on the top 101 and having a top diameter of 0.313 inches, a bottom diameter of 0.156 inches (i.e., a 60 deg. taper), and a height of 0.22 inches. The base 100 and spindle 104 may be formed as a single unit or assembled as two separate components, whether by screw/nut or by welding, or the like. All components of the base 100 are preferably composed of materials of suitable strength and durability. Preferably, materials include, but are not limited to, hardened and tempered steel, or other appropriate metal alloys known to those skilled in the art. Although the base 100 is depicted as having a generally circular plan, it should be noted that a plan of any shape or cross-section may be used without departing from the spirit of this invention.

The pivot body 200 suitably interacts with the base to create a first operable pivot point for the apparatus 1. The pivot body 200, as discussed below, also provides an avenue for the rail 300 to linearly move therein. The structural features of the pivot body 200 are best seen in FIGS. 8 and 9 through 13 (FIG. 8 is an exploded view of the pivot body 200, FIG. 9 is a perspective view of the pivot body 200, FIG. 10 is a bottom view of the pivot body 200, FIG. 11 is a top view of the pivot body 200, and FIGS. 12 and 13 are side views of the pivot body 200). As seen in the figures, the pivot body 200 features: a top 201; a bottom 202; a spindle receptacle 203; an avenue 204; a guide aperture 205; clamping components 210; and adjustment screws 211.

Referring now to FIGS. 13 and 15, the spindle receptacle 203 defines a cutout of the bottom 201 of the pivot body 200 and generally features a profile that matches the profile of the spindle 104. Being of similar profile, the spindle receptacle 203 is adapted to slidably receive the spindle 104 whereby the top 101 of the base 100 and bottom 202 of the pivot body 200 are slidably interfaced. Preferably, the spindle 104 may be directed through the spindle receptacle 203 until concentrically aligned with the pivot body 200. Once concentrically aligned with the pivot body 200, the spindle 104 may be swivelably affixed to the pivot body 200 via a clamping means. In one embodiment, the clamping means are as depicted in FIG. 8, namely, two components 210 slidably fitted within the spindle receptacle 203 to engage the spindle 104. Suitably, the sides of the spindle receptacle 203 and the ends of the components 210 fit into the taper of the spindle 104 in the manner of a tongue and groove whereby the pivot body 200 may freely turn around the spindle 104 without unseating from the base 100. It should also be noted that the clamping components 210 may be preferably secured to the pivot body 200 via adjustment screws 211 passing through the components 210 to interact with the pivot body 200. The adjustment screws 211 may be further utilized to prevent the rotation of the pivot body 200 around the spindle 104 via screw 211 interaction with the spindle 104 whenever the adjustment screws 211 are screwed far enough into the pivot body 200 to apply friction to the spindle 104. An alternative method of seating the spindle within the pivot body 200 is via a bore at the bottom of the pivot body 200 for receiving the spindle 104 and a positive clamping means generally disclosed by U.S. Pat. No. 3,812,756 (issued May 28, 1974) for retaining the spindle 104 within the bore. Measured graduations may be marked to provide a reference scale with the base 100 and pivot body 200 to permit repeatability in a workpiece cut with a degree of accuracy.

As discussed below, the avenue 204 and guide aperture 205 are for respectively receiving the rail 300 and rail guide 310.

In one embodiment, the pivot body 200 is generally cylindrical and dimensioned as follows: diameter, 2.316 inches; height, 0.463 inches; and, dimensioned to match correspondingly received components of the other subassemblies of the apparatus 1. The pivot body 200 may preferably be composed of materials of suitable strength and durability. Such materials include, but are not limited to hardened and tempered steel or other appropriate metal alloys known to those skilled in the art. Although the pivot body 200 is depicted as having a generally circular plan, it should be noted that a plan of any shape or cross-section may be used without departing from the spirit of this invention.

The rail 300 is for linearly and/or diametrically moving the pivoting tool holder 400 with respect to the first operable pivot point of the pivot body 200. In operation, the rail 300 linearly moves within the avenue 204 and over the spindle 104. The structural features of the rail 300 are best seen in FIGS. 8, and 16 through 19 (FIG. 8 is an exploded view of the rail 300, FIG. 16 is a top perspective view of the rail 300, FIG. 17 is a bottom perspective view of the rail 300, FIG. 18 is a front view of the rail 300, and FIG. 19 is a side view of the rail 300). As depicted in the figures, the rail 300 features a top surface 301, a bottom surface 302, a dove tail 303, a track 304, a spindle receptacle 305, a screw receptacle 306, a guide pin 310, a lead screw 320, and screw caps 321.

The dove tail 303 may be for guiding the rail 300 through the avenue 204. As best seen via FIGS. 18 and 12 the male profile of the dove tail 303 generally matches the female profile of the avenue 204 whereby the rail 200 may be slidably seated therein the avenue 204 (i.e., slidable along the dove tail 303 and avenue 204 interface). Preferably, the rail 300 is diametrically and linearly slidable across the first operable pivot point of the pivot body 200 when thus seated in the avenue 204. Referring now to FIG. 9, it should be noted that the rail 300 and avenue 204 plane is vertically superior to the spindle 104 whereby operation of the spindle 104 within the spindle receptacle 203 does not interfere with operation of the rail 300 within the avenue 204, and vice versa.

The track 304, as discussed below in connection with the guide 310, preferably retains the rail 300 within the avenue 204 and dictates the range of linear motion therein. Referring now to FIGS. 8, 11 and 17, the guide pin 310, as depicted in FIG. 8, may be simultaneously received by the guide receptacle 205 and track 304 whereby the rail 300 may only be permitted to travel within the avenue 204 so long as the guide pin 310 does not abut the track 304 ends. In other words, the guide pin 310 may preferably be retain by the guide receptacle 205 in a single position relative to the pivot body 200 but movably retained with respect to the track 304 of the rail 300 whereby the rail 300 may be permitted to move along the avenue 204 until the guide pin 310 abuts either end of the track 304.

Referring to FIGS. 8 and 16, the spindle receptacle 305 may be generally for receiving a spindle 410 for swivelably securing the tool holder 400 to the rail 300. Suitably, the lead screw 320 may be adapted to pass through the screw receptacle 306 and the spindle 410 whereby the spindle 410 is retained within the spindle receptacle 305 with its grove 411 projecting normal to the top surface 301 of the rail 300 similar to the manner in which the spindle 104 projects normal to the top surface 101 of the base 100 (as depicted in FIG. 15). As discussed further below, the upward projection of the spindle 410 enables the swivelable seating of the tool holder 400 on the rail 300 (i.e., the second operable pivot point of the apparatus 1). The top surface 301 of the rail 300 may preferably be marked with a centerline to identify whenever the tool holder 400 pivot is offset therefrom.

The screw receptacle 306 is generally for receiving the lead screw 320, as depicted in FIG. 8. Referring now to FIG. 8, FIG. 11, and FIG. 16, the screw generally enters the a first side of the rail 300, passes into the track 304, passes through the threaded hole of the guide pin 310 retained by the guide receptacle 205, passes through the remainder of the track 304, through the spindle 410 retained by the spindle receptacle 305, and passes through the remainder of the rail 300. The lead screw 320 is retained within the rail 300, in the configuration thus disclosed, via a screw cap 321 at either end thereof. As disclosed, the lead screw 320 is only in threaded relationship with the guide pin 310. Rotation of the screw 320 via either screw cap 321 forces the threaded movement rail 300 along the avenue 204 because: (1) the guide pin 310 is retained by the guide receptacle 205 whereby movement of the guide pin 310 with respect to the pivot body 200 is prevented; and (2) the retention of the lead screw 320 within the rail 320 by the screw caps 321 prevent the screw from moving with respect to the rail 300. In other words, movement of the lead screw 320 through the relatively stationary guide pin 310 results in the simultaneous movement of the rail 300 along the avenue 204. The disclosed lead screw 320 mechanism may alternatively be accomplished as generally disclosed in U.S. Pat. No. 143,080 (issued Sep. 23, 1873). Measured graduations may be marked to provide a reference scale with the rail 300 and pivot body 200 to permit repeatability in work-piece cuts with a degree of accuracy.

In one embodiment, the rail 300 may be dimensioned as follows: length, 4.750 inches; width, 0.75 inches; height, 0.281 inches; a 60 degree dovetail; the center of the spindle receptacle 305 is preferably offset from a first end by 1.250 inches from a first end of the rail 300 (as discussed below, the offset provides an advantage in terms of adjusting the size of the largest radial cut capable of being made by the apparatus); the track being 2.960 inches in length, offset from a second end of the rail 300 by 0.0625 inches. Despite the recitation of the above dimensions, it should be noted that the rail 300 in cross-section profile is preferably hardened steel, a width of ⅓ the pivot body 200, and a length of at least one and a half times the desired tool holder 400 centerline height since such proportions may permit maximum diameter radius to be cut in the work piece with the tool holder 400 offset or mounted at one end of the rail 300 as depicted in the figures. Subject thereto, all components of the rail are preferably composed of materials of suitable strength and durability. Such materials include, but are not limited to, hardened and tempered steel or other appropriate metal alloys known to those skilled in the art. Although the rail 300 is depicted as having a generally 60 degree dovetail cross-section, it should be noted that dovetails of any degree may be used without departing from the spirit of this invention.

The tool holder 400 generally provides a second operable pivot point to the apparatus 1 and generally holds a cutting tool in vertical relationship with the pivot body 200 and rail 300 for application to a lathe work-piece. The structural features of the tool holder 400 are best seen in FIGS. 8, and 20 through 25 (FIG. 8 is an exploded view of the tool holder 400, FIG. 20 is a perspective view of the tool holder 400, FIGS. 21 through 25 are respectively top, bottom, right side, left side, and front views of the tool holder 400). As depicted in the figures, the tool holder 400 features a top surface 401, a bottom surface 402, a spindle receptacle 403, a tool repository 404, the spindle 410, spindle clamps 411, a platform 420, and a cam lobe 421.

Referring first to FIGS. 8, 22, and 25, the tool holder 400 may be preferably and pivotably affixed to the rail 300 via the spindle 410, spindle receptacle 403, and spindle clamps 411 in the same manner that the pivot body 200 is pivotably affixed to the base via the spindle 104, the spindle receptacle 203 and the clamps 210. Specifically, the spindle 410 and spindle receptacle 403 feature matched profiles whereby the spindle 410 may be slidably received by the spindle receptacle 403 until the spindle 410 and tool holder 400 are concentered. To secure the tool holder to the spindle, clamps 410 are inserted into both sides of the spindle receptacle 403 whereby the groove of the spindle 410 interacts with the clamps 411 and side of the receptacle 403 in the manner of a tongue and groove to swivelably retain the spindle within the tool holder 400. A screw 450 is disposed through the clamps 411 to hold the clamps 410 in place within the spindle receptacle 403. It should be noted that swivelability of the tool holder may also be accomplished via a positive locking articulation similar to that disclosed by U.S. Pat. No. 3,812,756 (issued May 28, 1974). Thus installed, the tool holder 400 may be pivoted around the spindle 410 to provide a second operable pivot point to the apparatus 1. The pivotability of the tool holder may be restricted via threading the screw 450 tightly within the clamps whereby the clamps 411 pinch and apply friction to the spindle 410.

Referring now to FIGS. 8 and 26 through 29, the tool holder 400 features a cam lobe 421 and platform 420 for manipulating the height of a cutting tool with respect to the pivot body 200 and rail 300. As depicted in the figures, the platform 420 sits within the lower portion of the tool receptacle 404 on top of the flat surface 422 of the cam lobe 421 which may be positioned within the cam lobe receptacle 405. As further seen in the figures, the platform 420 features a sloped lower portion whereby rotation of the cam lobe 421 causes the flat surface 422 to obliquely interact with the slope whereby the platform rises until it is rests perpendicularly to the flat surface 422 of the cam lobe 421. The above described adjustable tool platform 420 may be implemented in the tool holder 400 assembly in order that tool height and attitude adjustment be manipulated to the optimum cutting position.

Referring now to FIG. 8, the tool holder 400 features borings 430 to accommodate rail 300 mounting of the tool against the platform 420. Screws are generally provided to the borings whereby a tool is clamped between the platform 420 and the screw bottoms as generally taught by U.S. Pat. No. 4,277,993 (issued Jul. 14, 1981). As seen in the figures, a double ended tool may be positioned in the tool receptacle 404 with both end of the tool extending from the tool receptacle 404 whereby either end of the tool may be applied by so orienting the tool holder 400.

In one embodiment, the tool holder 400 may be dimensioned as follows: length, 1.375 inches; width, 0.75 inches; height, 2.250 inches; and the raiseable platform 420 may vary in vertical height by roughly +/−0.25 inch vertical travel and 0.125 inch horizontal from center and +/−15° pitch. Despite the recitation of the above dimensions, it should be noted that the rail 300 in cross-section profile is preferably hardened steel, a width of ⅓ the pivot body 200, and a length at least one and a half times the desired tool holder 400 centerline height since such proportions may permit maximum diameter radius to be cut in the work piece with the tool holder 400 offset or mounted at one end of the rail 300 at the spindle 410 receptacle as depicted in the figures. Subject thereto, all components of the tool holder 300 are preferably composed of materials of suitable strength and durability. Such materials include, but are not limited to, hardened and tempered steel or other appropriate metal alloys known to those skilled in the art. Although the rail 300 is depicted as having a generally 60 degree dovetail cross-section, it should be noted that dovetails of any degree may be used without departing from the spirit of this invention.

The handle 500 is of a quick release type and may be used for multiple operations. Referring to FIGS. 1 through 8, the handle 500 may be used, as depicted, to torque the screw 450 whereby the pivotability of the tool holder 400 may be restricted or permitted. When pivoting is permitted, the handle 500 may be used to control the pivoting of the holder 400. The handle 500 is also adapted to release from its position on the holder 400 screw 450 and removably fit over either cap 321. When fastened to the screw caps 321, the handle may be used to either: (1) torque the lead screw 320 to linearly move the rail 300; or (2) control the pivoting of the pivot body 200 around the spindle 104. Multiple handles 500 may be applied to the apparatus for simultaneous control of the various components thereof.

The apparatus 1 may also include chuck guard, a precautionary feature that safely eases the pivot body 200 away from the chuck jaws in the event of inadvertent strike. While not fail safe, the guard helps prevent operator injury and lathe gear binding if there is a collision with device and the lathe chuck jaw.

As discussed above, the apparatus 1 may be mounted on a support in proximity to a lathe (often the support is the cross slide of a lathe) in order to accomplish geometric manipulation of a work-piece. Convex radii may be cut into a work piece surface via either: (1) positioning the second pivot point of the apparatus (i.e., the spindle 410) in closer proximity to the lathe's axis of rotation than the first pivot point (i.e. the spindle 104) and applying the tool to the work piece by pivoting the first pivot point; or (2) applying the tool to the work-piece by pivoting the second pivot point regardless of its relationship to the first pivot point. Concave radii may be cut into a surface via positioning the first pivot point in closer proximity to the lathe's axis of rotation than the second pivot point and applying the tool to the work piece by pivoting the first pivot point. Tapering may be accomplished via orienting the rail 300 to the desired taper angle with respect to the lathe's axis of rotation and applying the tool to the work-piece by moving the rail 300 linearly along the avenue 204. Compound tapering and radii cutting can be achieved via rotating the tool-holder while or in addition to performing the above mentioned methods in series or simultaneously.

A suitable feature of the invention is that the invention swiftly converts from radius to taper turning mode, as the rail 300 and tool holder 400 assembly permit swift and accurate angle adjustment. Using the above identified methods, this invention has the distinct advantage to rapidly change configuration, and to cut tapers in either direction, externally or internally, and to bore very efficiently. In particular, the apparatus 1 may typically be operated in one of two interchangeable orientations/configurations: first, the end of rail 300 featuring the offset tool holder 400 may be positioned in closer proximity to the work piece than the opposite end of the rail 300 in order to the produce larger orientation rail 300 and lead screw mechanism can be installed in 2 configurations to improve cutting flexibility with respect to rail clearance with the lathe chuck. With the lead screw installed with the pivot offset adjust knob is oriented nearest the tool holder post, the maximum radius convex cut can be obtained, whereas the maximum radius concave cut is obtained if the lead screw is installed in the opposite orientation.

A primary advantage of the present application over the prior art is the ability to manipulate a tool to perform compound radial turning and tapering. Unlike the prior-art where secondary pivots, if available, are not operable for more than merely setting the location of the tool and cannot otherwise be effectively manipulated while shaping a work piece, the presently disclosed apparatus features two primary and operable pivots which may be slidably associated whereby the apparatus may be used by its operator to accomplish the application of a tool to a lathe work piece via manipulating the second operable pivot point in addition to rotation of the tool around the first pivot and/or linear movements of the tool. The identified operable secondary pivot point enhances the types of geometries capable of being cut by the tool-rest and enables the use of a roulette motion to control precise radial tool path and orientation along the desired work piece cuts. These features, among others, are not known in the prior art.

It should be noted that FIGS. 1 through 29 and the associated description are of illustrative importance only. In other words, the depiction and descriptions of the present application should not be construed as limiting of the subject matter in this application. For example, the relative sizes and component shapes within apparatus 1 may be manipulated without changing the spirit of the invention. Additional modifications may become apparent to one skilled in the art after reading this disclosure.

I claim:

1. A tool apparatus for use with a lathe comprising:
   a first operable pivot point defined by a base with a first spindle that is swivelably affixed to a pivot body;
   a rail that is disposed in an avenue through the pivot body so that the rail is linearly movable over said first spindle; and,
   a second operable pivot point that is swivelably affixed to the rail via engagement of the second spindle, wherein the second operable pivot point is disposed on the rail for repositioning the axis of rotation of the second operable pivot point in relation to the axis of rotation of the first pivot point via linear movement of the rail over the first spindle.

2. The apparatus of claim 1 wherein the second spindle that is swivelably by the spindle receptacle of the tool holder is offset from the lengthwise center of the rail.

3. The apparatus of claim 1 wherein the linear movability of the rail is restricted by a track long the bottom of the rail that interacts with a guide pin in a fixed position relative to the pivot body.

4. The apparatus of claim 3 wherein the second pivot is installed on the rail at a position which is offset from the lengthwise center of the rail.

5. A method of cutting a work-piece that is rotably mounted on a lathe, the method comprising the steps of:
   providing a cutting tool to first operable pivot point disposed on a rail;
   moving, via linear movement of the rail over a spindle whereby operation of the spindle does not interfere with operation of the rail, the axis of rotation of the first operable pivot point in relation to the axis of rotation for a second operable pivot point comprised of the spindle; and,
   applying the tool to the work piece by rotating the tool around the first pivot point.

6. The method of claim 5 wherein the second operable pivot point is defined by a pivot body receiving the spindle from a base.

7. The method of claim 6 wherein the first operable pivot point is defined by a tool holder receiving another spindle.

8. The method of claim 7 wherein the step of moving the first pivot point is accomplished by sliding the rail on the pivot body, the rail featuring the spindle that is received by the tool holder.

9. The method of claim 8 wherein the spindle that is received by the tool holder is offset from the lengthwise center of the rail.

10. The method of claim 9 wherein the second pivot is installed on the rail at a position which is offset from the lengthwise center of the rail.

11. The method claim 10 wherein the rail is dovetailed in cross-section profile.

12. The method of claim 11 wherein the rail has a length that is at least one and a half times the tool holder centerline height.

13. The method of claim 9 further comprising the step of pivoting the tool around the first pivot to contact the work piece while linearly moving the first pivot point via linearly moving said rail over said spindle without the spindle interfering with the linear range of motion of the rail.

14. A method of fabricating a lathe accessory comprising the step of:
   obtaining a base with a first spindle;

pivotably installing a pivot body on the first spindle;
slidably fitting a rail into the pivot body so that it (a) vertically superior to said first spindle and (b) linearly movable without interference from said first spindle, wherein the rail features a second spindle; and,
pivotably installing a tool holder on the second spindle.

15. The method of claim 11 wherein the tool holder is installed on the rail at a position which is offset from the lengthwise center of the rail.

16. The method of claim 12 wherein the rail is preferably dovetailed in cross-section profile with a width of approximately one-third the pivot body, and of a length at least one and a half times the tool holder centerline height whereby a work-piece may be shaped into a geometric structure with a maximum diameter radius.

* * * * *